March 10, 1953  R. O. HENSZEY  2,631,105
METHOD AND APPARATUS FOR EVAPORATING MILK
Filed Sept. 26, 1950  3 Sheets-Sheet 1

INVENTOR.
Roy O. Henszey
BY Wheeler, Wheeler & Wheeler
ATTORNEYS

INVENTOR
ROY O. HENSZEY
BY Wheeler, Wheeler & Wheeler
ATTORNEYS

March 10, 1953  R. O. HENSZEY  2,631,105
METHOD AND APPARATUS FOR EVAPORATING MILK
Filed Sept. 26, 1950  3 Sheets-Sheet 3
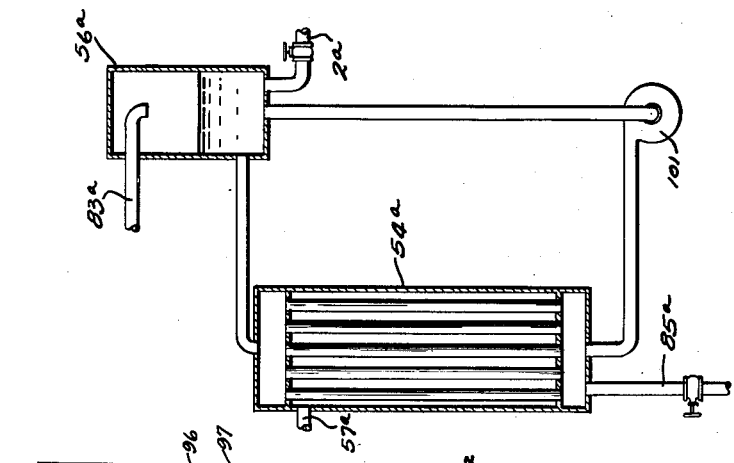
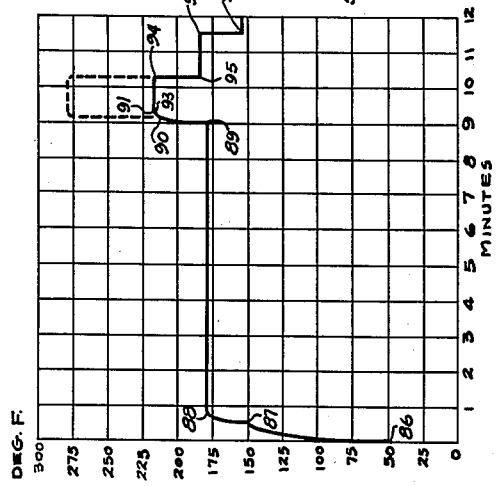
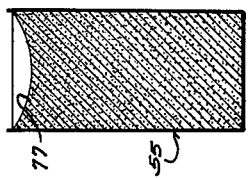
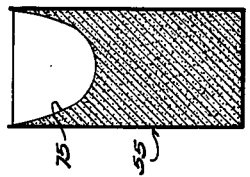
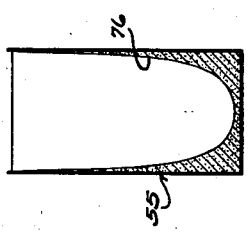
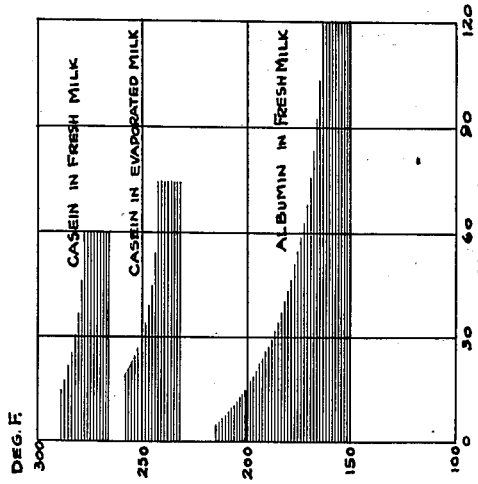
INVENTOR.
ROY O. HENSZEY
BY
Wheeler, Wheeler & Wheeler
ATTORNEYS Patented Mar. 10, 1953

2,631,105

UNITED STATES PATENT OFFICE 2,631,105

METHOD AND APPARATUS FOR EVAPORATING MILK

Roy O. Henszey, Oconomowoc, Wis.

Application September 26, 1950, Serial No. 186,840

13 Claims. (Cl. 99—200)

This invention relates to improvements in apparatus and methods for heating and evaporating milk and the like. It preferably, though not necessarily, involves successive heating stages.

The invention seeks, among other things, to control the characteristics of the product, to effect heat economies in heating, to effect temperature control, and to avoid burn-on, by the following procedures hereinafter more fully explained:

1. In the course of multiple stage heating, the milk is raised rapidly through the range or ranges of temperatures where precipitation of some of its various components occurs, thus controlling the extent and fineness of precipitation.

2. Abruptness of temperature rise through a critical stage is made possible by pre-heating the milk to the beginning of such stage and accurate pre-heating without special controls is accomplished by using in heat exchangers of appropriate design vapor from one or more of the effects of the evaporator, the evaporator being operated to yield vapor at the desired temperatures.

3. Burn-on during the heating is avoided by using vapor from an evaporator which vapor is below such a temperature as can cause appreciable precipitation under the existing conditions on the heating surface, and at higher temperature by having the milk pre-heated, abruptly exposing it to relatively hot heat exchange surfaces only momentarily to raise the milk through a desired range, and then removing it from contact with the said surfaces before material precipitation has occurred.

Milk and other organic products have components which precipitate, coagulate or otherwise break down at approximately predetermined temperatures. Since milk is the product in which I am particularly interested, I shall refer particularly to milk in the present application with the understanding that the invention has application also to other organic products presenting like problems.

An object of my invention is to provide means for causing the amount and kind of coagulation and precipitation that is desirable in, for example, milk to be made into evaporated milk. I provide pre-heating means for pre-heating without any precipitation, and also for additional pre-heating for not only coagulating part or all of the albumen, but also a small part or a large part of the casein, as may be desired.

It is an object of the invention to heat milk or other organic products without "burn-on" and at the same time to provide automatic control of temperatures to which the milk is subjected.

It is my purpose also to heat the milk or other organic product preliminary to its processing, evaporating or sterilizing. It is also desired to reduce burn-on in the evaporator by the manner in which the milk, or the like, is treated prior to the time it reaches the evaporator.

At a temperature of approximately 158 degrees Fahrenheit, the albumen of whole milk begins to coagulate and coagulation of albumen can be substantially completed at about 212 degrees Fahrenheit. At 150 degrees Fahrenheit, small quantities of calcium may precipitate, and the rate increases rapidly up to the boiling point. At higher temperatures casein coagulates. If the milk temperature has been raised otherwise than by instantaneous flash heating, much of the calcium will precipitate and on account of this the casein will not precipitate until about 270 degrees Fahrenheit is reached, but if the milk is instantly flashed to even as low as 212 degrees, some of the calcium still momentarily being in solution will cause precipitation of casein. An instant later the calcium will be precipitated and the remainder of the unaffected casein in whole milk will not precipitate until its temperature reaches about 270 degrees Fahrenheit.

If the milk is heated by continued contact with the hot surfaces of a heat exchanger within the temperature range in which coagulation occurs, filmlike deposits tend to form on such surfaces. Since the rate of coagulation is in part a function of time and temperature, the higher the temperature and the longer the time of contact the greater will be the deposits. At present, efforts are made to minimize these deposits by propelling the milk over the heating surfaces at considerable velocities whereby the milk exercises a scouring action. I may make use of the high velocity movement of the milk for the same purpose, but it is an object of the invention to further reduce the deposits on the heating surfaces by means not heretofore used.

In this connection, I desire to treat the milk by raising its temperature in stages. It is my object, moreover, to so control the stage heating of the milk that one stage of heating will terminate preferably just below the point at which coagulation may first occur. For example, when milk must be heated to a temperature of 180 degrees, it is possible in one stage of heating to raise the temperature of the milk to 145 degrees or any temperature below about 158 degrees Fahrenheit with no possibility of burn-on, thus minimizing the problem of raising the milk through the additional 35 degrees of temperature required.

Preferably, I accomplish this stage of preheating by subjecting the milk to the heat of the vapor from a milk evaporator, at least the major part of the vapor being preferably taken from a low temperature effect, where such vapor has a temperature which will not cause burn-on.

Two stages of vapor heating are shown in Figs. 1 and 2. One arrangement is to have the evaporator give off vapor from the first, second and third effect at temperatures of say, 180 degrees Fahrenheit, 160 degrees Fahrenheit and 120 degrees Fahrenheit, respectively. Milk heaters each using vapor from a separate effect can be used to heat in stages to within ten degrees of the vapor, i. e., to 110 degrees, then to 150 degrees, then to 170 degrees. The two first mentioned can cause no burn-on and the latter being not far above the coagulating point can cause only little burn-on.

It is my further object to heat the milk abruptly by contact with high temperature heat exchange surfaces to a temperature required for proper coagulation of its albumen and/or casein components thereupon moving the milk away from the heating surfaces before appreciable deposits of precipitated material have been made upon said surfaces. I have discovered that, if the milk is exposed during the period of precipitation to a heating surface appreciably hotter than the milk, the precipitated material will tend to deposit on the hotter surface. But, if, prior to substantial precipitation, the milk is moved away from the surfaces hotter than itself, which have abruptly raised its temperature, then precipitation will occur in situ, that is to say, will occur in the body of the milk rather than upon the surrounding surfaces which, during the period of coagulation, are preferably no warmer than the high temperature to which the milk was then heated. The preciptate formed by quick heating will be relatively very fine and will coagulate in more and smaller particles than that which precipitates during a holding period, but the latter precipitation is mostly adsorbed on the former particles. Part of this abrupt heating is preferably done by means of the heat from vapor from one of the higher temperature effects of the milk evaporator. Although the temperature of the heating surface may be about 25 degrees above the point at which coagulation begins, I have found that burn-on is negligible if the milk velocity over the heating surface is only slightly greater than the normal rate of flow in pipes. If the temperature were fifty degrees or sixty degrees Fahrenheit above the coagulation point the 150 degree milk would need an enormous velocity to prevent burn-on. Further heating above 180 degrees Fahrenheit, therefore, is then preferably done in a higher and additional stage or stages in heat exchangers heated usually by boiler steam hotter than the vapor from the evaporator and an additional abrupt temperature increase may be made.

Since coagulation is in part a function of temperature and time, each time the milk receives an increment of temperature it may be held for a time in a holder, where, if the temperature is above the precipitating point, some coagulation will take place. This coagulation will decrease the tendency to burn-on in the subsequent stages. The longer the holding period the more the coagulation, but also generally the larger the particle size.

To permit the coagulation in small particle size and also for other reasons explained later, the temperature rise at and above the point where precipitation begins must be abrupt. This abrupt rise may be achieved in the 150 degree Fahrenheit to 175 degrees Fahrenheit stage with tubular heaters without causing burn-on, but in the higher stages there may be some burn-on unless very high velocity in the vicinity of 18 feet per second is used, or unless preceded by holding periods for coagulation. Since a control of the fineness of coagulation and other physical qualities of the milk is desired, provision is preferably made so that the holding periods may, if desired, be held to a minimum.

I allow for coagulation of part of the casein before evaporation, where the process and the nature of the particular milk make it desirable. This may require temperatures in the neighbodhood of 270 degrees Fahrenheit if the milk salts and albumen have already been precipitated; otherwise, it can be done at lower temperatures. In stantaneous heating of milk from 150 degrees or less to about 215 degrees Fahrenheit of cold milk causes considerable casein to be precipitated, as considerable of the calcium salts are still in solution when this temperature is reached. The quantity of salts in solution and the degree of acidity, as well as high percent of casein itself, all tend to lower the precipitation temperature of casein. I have, therefore, so far found this high heat of 270 degrees unnecessary.

I am aware, of course, that the preheating to 270 degrees can greatly increase stability. The same apparatus allows of this abrupt heating at any temperature. Although I find that temperatures above 212 degrees Fahrenheit are often desired, a temperature much below 270 degrees is apparently ample for most processing.

It is, therefore, my object to heat in stages, preferably raising the temperature abruptly in each stage if the temperature is near or in the precipitation range; to terminate one stage of heating under conditions such that both the milk and the surface to which the milk is exposed will be immediately below the coagulation temperature, whereby the burn-on problem involved in further heating will be minimized; and to so control the high temperature heating of the milk above the burn-on point as not only to minimize burn-on but to exert some control of the particle size of the coagulant and, so far as possible, to effect in situ such coagulation as occurs.

Other objects of the invention can best be clarified after the invention has been disclosed.

In the drawings:

Fig. 4 is a diagrammatic chart approximating the curves showing coagulation in a typical milk sample.

Fig. 5 is a diagrammatic chart showing the manner in which temperature can be controlled throughout a given period of treatment of a typical milk sample.

Figs. 6, 7 and 8 are diagrammatic views on a reduced scale showing the disposition of the milk in the scraper heater of Fig. 3 at different speeds of scraper operation.

Fig. 9 is a diagrammatic view in vertical section showing a modified embodiment of a high temperature, high velocity, recirculating heater which, for example, may be used alternatively with the device shown at 54 in Fig. 2.

Figure 1:
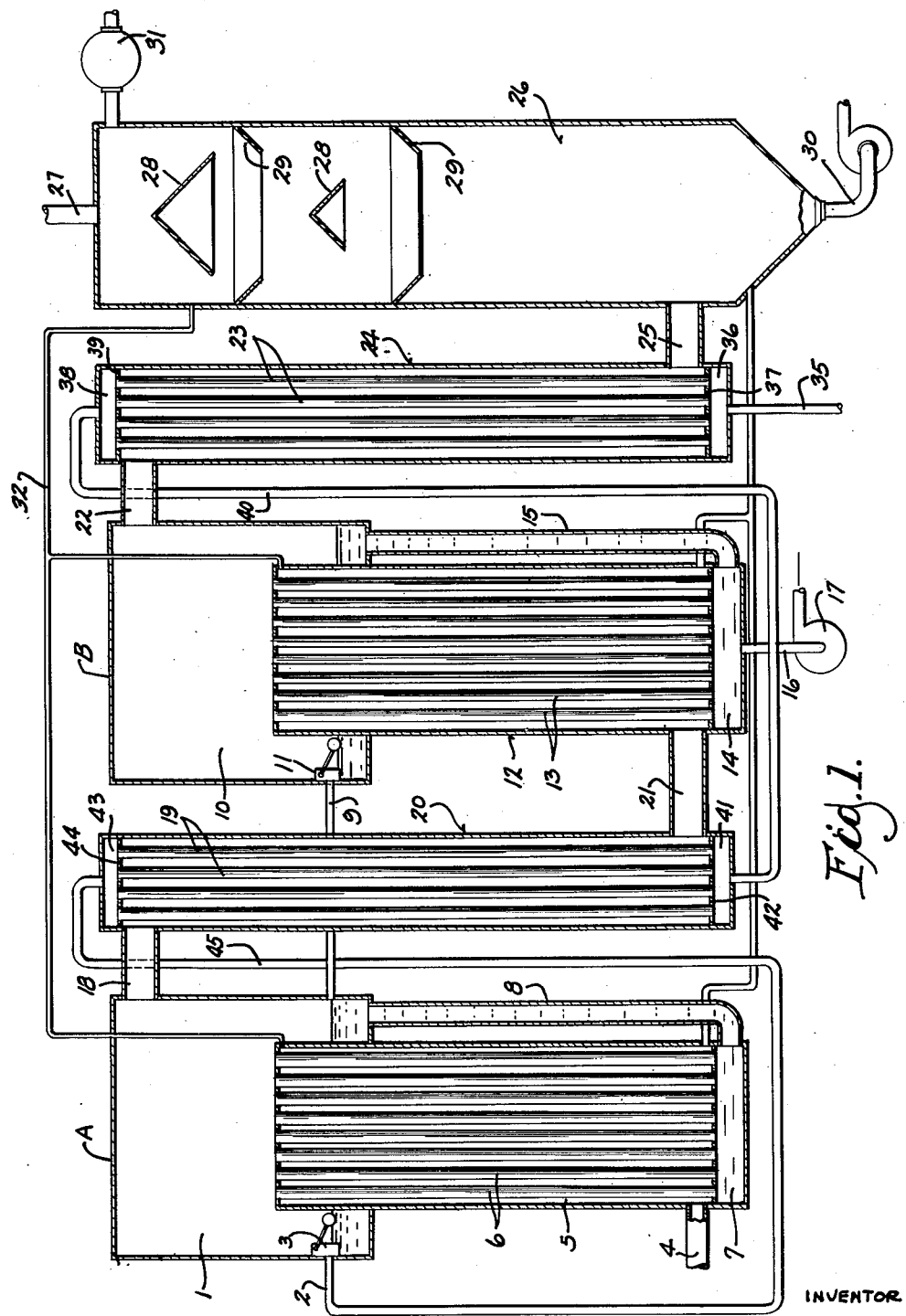
Fig. 1 illustrates diagrammatically in vertical section the component parts of a milk evaporator and heaters for the practice of the invention.

Reference will first be made to the embodiment shown in Fig. 1.

The evaporator could comprise several effects, but for this illustration it comprises two effects designated by reference characters A and B. The milk to be evaporated enters the chamber 1 of the first effect through a pipe 2 subject to the control of a float valve 3. Steam is supplied, usually at a temperature of 212 to 215 degrees, through pipe 4 to the heater 5 through which the milk to be evaporated is circulated by gravity in pipes 6 opening upwardly into chamber 1 from the space 7 below the header. Pipe 8 provides for downward circulation from chamber 1 to the space 7 below the header from which the pipes 6 lead upwardly.

The pipe 9 carries the partially concentrated milk from chamber 1 to chamber 10, subject to the control of a float valve 11. The heater 12 of the second effect corresponds generally to the heater 5 of the first effect. It comprises a space heated by vapor or steam as will hereinafter be described through which tubes 13 open upwardly through the heater from the space 14 below the header. Downward circulation from chamber 10 is provided by pipe 15. The milk sufficiently concentrated may be withdrawn through pipe 16 by a pump 17.

The vapor from chamber 1 is carried through pipe 18 into the space about the tubes 19 of a heat exchanger 20. From such space another pipe 21 leads the vapor into the space around the tubes of the heater 12 where it is used to effect evaporation of the milk in tubes 13.

The vapor from chamber 10 of effect B passes through pipe 22 into the space about the tubes 23 of a heat exchanger 24. From the heating space of the heat exchanger 24, the vapor passes through pipe 25 into the condenser 26. Water introduced through pipe 27 and flowing over baffles 28, 29 condenses the vapors. The water and condensate are discharged by pipe 30, and a vacuum pump 31 discharges non-condensable gas and assists in maintaining a vacuum in the entire system. A bleed duct 32 leads ultimately to the condenser from the tops of the heating spaces of the heaters 5 and 12 to carry off any air which may be trapped therein.

The milk to be heated arrives through pipe 35 to the space 36 below the header 37 in the heat exchanger 24 and passes through the tubes 23 to the space 38 above the upper header 39. Thence the milk is led through pipe 40 to the space 41 below the header 42 of the heat exchanger 20. Passing through the tubes 19 of heat exchanger 20 to the space 43 above the upper header 44, the milk is then led through pipe 45 which may communicate with pipe 2 which admits the pre-heated milk to the first effect A.

It will, of course, be understood that the illustration is not only diagrammatic but purely by way of exemplifying one possible organization for the practice of the invention. By associating the heater with an evaporator, I desirably pre-heat the milk to a temperature just below that at which substantial precipitation occurs (for example, 158 degrees to 160 degrees Fahrenheit) and hold this temperature automatically in a continuous operation without requiring any special controls.

When an evaporator is set in its normal operation, there will be a predetermined temperature and pressure differential between the first effect and the condenser which will automatically distribute itself between the several effects. The differential is a function of initial steam temperature and of the amount of cooling in the condenser among other factors. It is possible to make use of the temperature drop between the several effects to derive vapor at a predetermined temperature which will automatically be maintained.

For example, it is conventionally possible to operate a two-effect evaporator, having effects A and B as here illustrated, with steam at about atmospheric pressure, in which case the steam temperature in the heater 5 will be approximately 212 degrees.

The partial vacuum produced in the chamber 1 will be such that the temperature of the vapor delivered from the milk in that chamber may be of the order of 180 degrees or, if it is desired to make a "low heat" product, it can be maintained at another temperature such as 160 degrees. The depression in chamber 10, greater than that in chamber 1, will be such that the vapor temperature in chamber 10 may be approximately 155 degrees, or it may be made as low as 120 degrees Fahrenheit, especially if a "low heat" product is made.

Now it is the vapor at approximately 120 degrees to 155 degrees, delivered from chamber 10 of effect B, that is used in heater 24 to heat the milk newly arrived from storage. This vapor would, in the ordinary evaporator, go directly to the condenser and the energy represented by its heat would be lost. Since the milk arriving from storage will ordinarily be at a temperature of approximately 40 degrees Fahrenheit, very substantial quantities of heat are required to raise its temperature to approximately 145 degrees or even to 110 degrees. This will be done in the heat exchanger 24 where the milk velocity need not be rapid to prevent burn-on. Since there is virtually no burn-on and no precipitation of any kind in milk at temperatures of 145 degrees or lower, it will be apparent that solely through the use of waste heat I can effect this much heating of the milk with very substantial energy savings and without any burn-on problems.

In previous attempts to heat milk for processing purposes, very rigid temperature control is required, and delicate thermostats and other supplemental controlling apparatus are usually employed. It will be observed that by means of the present invention all need for such control equipment is eliminated since the evaporator automatically yields vapor which, once the evaporator is set in operation under the desired conditions, will remain at a very constant temperature. With the heat exchanger properly designed to take advantage of the temperature available in the final effect of the evaporator, there will be no need for any additional temperature control apparatus of any description, nor will any skill or attention be required.

When it is desired to raise the temperature of the milk above the temperature attainable in heater 24 by using vapor from effect B, the milk may be passed through the second heat exchanger 20 where it is subjected to the higher temperatures of the vapor derived from the first effect A. Here the heat exchanger is preferably so designed as to maintain a moderately high velocity of the milk through the tubes but, for a given velocity, the deposit or burn-on will be materially less than would be the case if the temperature differential between the vapor and the milk were greater. If the design is such that the milk is raised only to about 158 degrees to 160 degrees Fahrenheit, or if the milk is raised to a somewhat higher temperature but is moved out of contact with the heat exchange surfaces before precipitation occurs, in either such case there will be no burn-on.

In heat exchanger 20, the energy used is not waste heat, although it has already done useful work in the first effect and is, theerfore, more economical to use than live steam. The use of the exchanger at 20 represents further economy because the heating of the milk in these vapor heated stages will have materially reduced burn-on, apart from any other consideration because the heating surfaces are thereby not so much hotter than the milk.

For the purposes of the present disclosure, the milk heated in exchanger 20 may pass to the first effect evaporator, especially if the product is to be what is usually called a "low temperature" product, but it will be understood that this is optional, for the milk might be heated for some other purpose. In other words, even if the device were not used to pre-heat milk for evaporation, it would still be valuable for the heating of milk or other organic liquids because of the automatic temperature control provided by the pressure and temperature gradient through the several effects of the evaporator.

In the construction shown in Fig. 2, the liquid feed is supplied through pipe 50 to the heat exchanger 51 (corresponding in general to heat exchanger 24 of Fig. 1) thence through heater 52 to a holding tank 53 (if such tank is required, as will hereinafter be explained) thence through the high temperature heater 54 and/or high temperature scraper heater 55, and thence through a holder 56 (if such be required) and thereupon through the heated fluid space 1 of evaporator A into the fluid space 10 of evaporator B, whence, after further concentration, the liquid is discharged through the pipe 16, as already described. It will, of course, be understood that evaporators A and B and condenser 26 and heat exchangers 51 and 52 are, except for specific connections presently to be described, similar to the organization shown in Fig. 1.

Figures 2, 3:
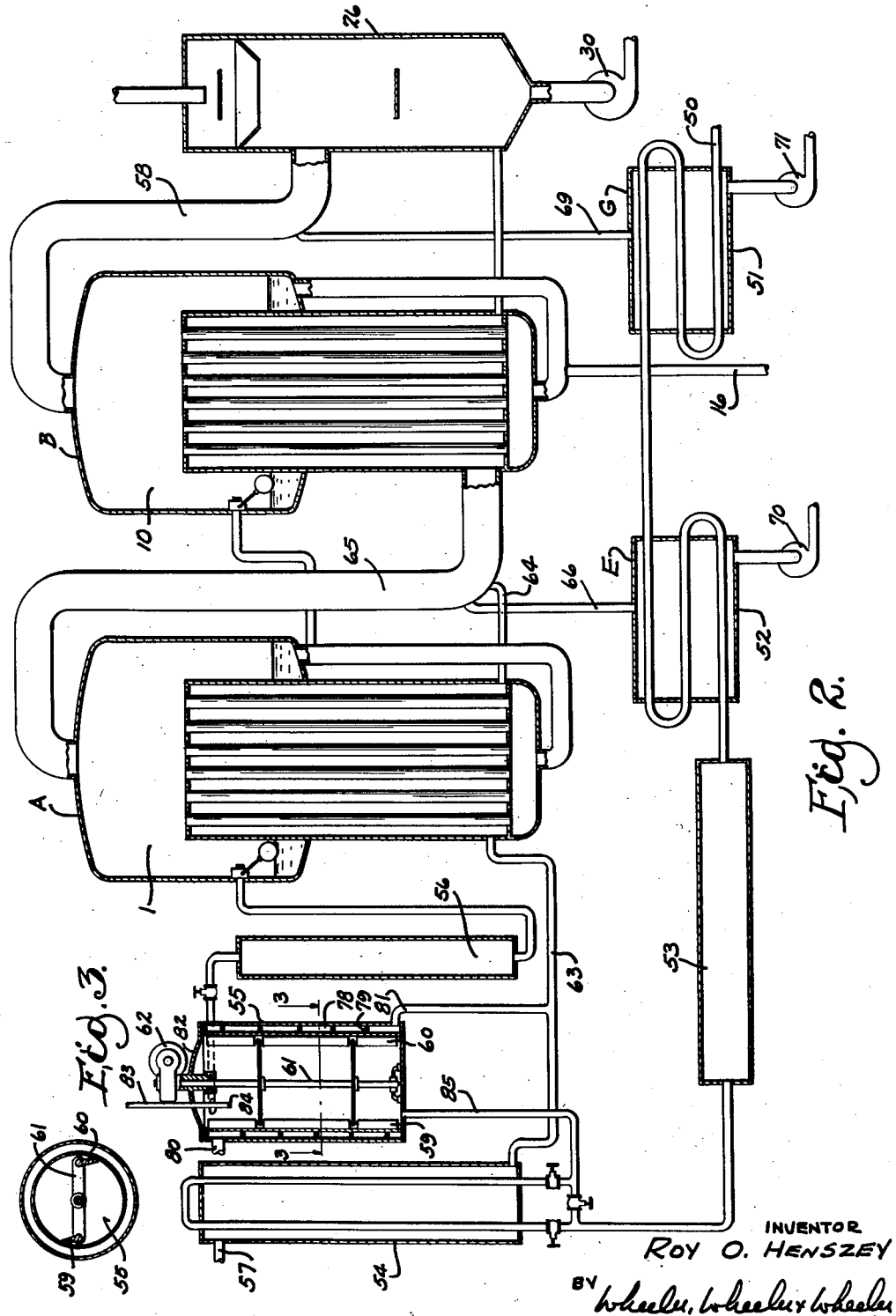
Fig. 2 is a similar diagrammatic illustration of a modified embodiment of the invention.
Fig. 3 is a detail view in transverse section through the scraper heater on the line 3—3 of Fig. 2.

The flow of heating fluid through the apparatus shown in Fig. 2 is as follows:

Steam is supplied to the inlets 57, 80 of high temperature heaters 54 and/or 55. The heating fluid and any condensate that may have formed in the heating fluid passages of the high temperature heaters 54, 55, passes out through the pipe 63 to the heating fluid space of the evaporator A. Steam is supplied also to evaporator A and any condensate therein formed may be passed to the heating fluid space of evaporator B.

Either the whole of the vapor from the dome of evaporator A, as in Fig. 1, or a part thereof, as in Fig. 2, is used as a heating fluid in the preheater. In Fig. 1 all the vapor from effect A is passed through the preheater 29. In Fig. 2 the branch pipe 66 carries to heat exchanger 52 such vapor as may be needed therein, the rest passing directly to the heating fluid passage of the second effect evaporator B, where it augments heating fluid and condensate derived via pipe 64 from the heating fluid space of the first effect A.

Vapor is carried from the dome of evaporator B through pipe 58 to the condenser 26. Either the whole of the vapor from evaporator B (as suggested in Fig. 1) or a desired part thereof, as in Fig. 2, is used to heat the liquid in the first preheater. In Fig. 1 all vapor en route to the condenser was passed through the heat exchanger 24. In Fig. 2, the branch pipe 69 leads from pipe 58 to the heating fluid jacket of the heat exchanger 51. Heat exchangers 51 and 52 may be vented to the condenser, as was done in the case of preheaters 29 and 24 in Fig. 1, or may have separate condensate pumps 70, 71 as in Fig. 2.

The heater 55 may either be used in lieu of heater 54 or as a supplement for further increasing the temperature of the liquid already heated in heater 54. Heater 55 may be a scraper heater having scraper blades 59, 60 mounted on a rotor 61 and driven by a motor 62. I prefer to employ the specific and novel type of scraper heater shown in which the motor drives the rotor 61 at variable speeds whereby to control the liquid vortex within the device. Where the rate of rotation is such as to develop in the milk a centrifugal force three or four times that of gravity, the surface of the milk will tend to approximate the position indicated at 75 in Fig. 7. Where the speed of rotation is sufficiently increased, the milk surface may approximate the line indicated at 76 in Fig. 6. If the rate of rotation is materially slower than indicated in Fig. 7, the surface of the milk may take the position of the milk at 77 in Fig. 8.

It will be observed that by regulating the speed of operation or the rotor 61 (either by controlling the motor speed or by driving the rotor through a rate-changer) the capacity of the heater 55 may be varied as desired; thereby regulating the time for which the milk will remain therein. There are several other features of the heater 55 which may be briefly described.

The steam jacket 78 is preferably provided with a helical partition 79 to guide the steam upon a helical path through the jacket from the inlet 80 to the outlet 81.

An auxiliary milk inlet can be guided through the hermetically sealed cover 82 by means of pipe 83. The main milk inlet is provided at 85. The inlets 83 and 85 may be used together or either inlet may be used alone.

While the connections shown in Fig. 2 specifically differ from those of Fig. 1, the operation so far as the evaporators and preheaters are concerned is essentially the same as in Fig. 1. The Fig. 2 construction and method are, however, more elaborate and particularly designed for evaporating milk. Description of the processing as practiced in the apparatus of Fig. 2 will, therefore, comprehend the processing as practiced in the apparatus of Fig. 1. The temperatures hereinafter mentioned are those particularly pertinent for milk.

Coagulation of albumen and casein constituents of raw milk depends both upon temperature and time as indicated by the chart illustrated in Fig. 4. Reference to the chart will show that to coagulate all the albumen of raw milk instantaneously would require temperatures in the vicinity of 220 degrees Fahrenheit. However, at temperatures of around 165 degrees Fahrenheit, all the albumen would not be coagulated even in an hour. Coagulation of the casein of raw milk would require temperatures in excess of 260 degrees for the now common methods of heating and, in addition, a time factor depending upon the temperature. Under certain conditions mentioned herein, casein can be coagulated at lower temperatures. It will, of course, be understood that the figures given are only approximate, inasmuch as raw milk is extraordinarily variable. Coagulation of casein in evaporated milk occurs at a somewhat lower temperature than in raw milk (where the raw milk is not instantaneously flash-heated as explained herein).

In accordance with the present invention, burn-on is minimized first, by the stage heating of the milk at controlled temperatures; secondly, by the abrupt heating of the milk in each stage to temperatures in excess of those required for coagulation of the component affected by the temperature in that stage, and if desired followed by holding the milk until such coagulation as is expected at the temperature in question has been completed; thirdly, by removal of the milk promptly from the contact with the high temperature heating surfaces on which deposits would otherwise be made and thereupon allowing coagulation to occur without further heat; and, fourthly, by substantially completing coagulation to or above evaporator temperatures before the milk is admitted to the evaporators.

As already disclosed, the vapor derived from evaporator B for use in the heat exchanger 51 is preferably at a fixed temperature below that at which appreciable coagulation will occur in the heat exchanger 51. Consequently, there will be little or no coagulation or deposits in this heat exchanger, regardless of velocity of milk flow.

The temperature of the vapor used as a heating agent in heat exchanger 52 may provide a high enough temperature to effect substantial coagulation of albumen, but the flow of the milk through the heat exchanger 52 may be so rapid that the milk is raised to the requisite temperature before appreciable coagulation can be deposited on the heating surface. Thereupon, the milk may be held in the holder 53 for a time interval sufficient to permit full coagulation to occur at such milk temperature. Here no appreciable deposit on the surface will occur for the reason that there is little or no upward temperature differential between the milk and the surfaces of the holder.

Because of the stage heating practiced at 51 and 52, and the consequent coagulation in situ in holder 53, the milk may be heated in the high temperature heaters 54 and 55 to 250 degrees Fahrenheit or more with little burn-on. If the temperature had to be raised in one step from about 50 degrees Fahrenheit to 265 degrees Fahrenheit prolonged exposure to the heat exchanger surfaces would be required. But according to this invention, the milk admitted to each of the very hot surfaces is already heated to the point at which coagulation is about to occur at the beginning temperature of that stage. Consequently, the milk can be raised through the whole range for that stage with so short an exposure that the milk will leave the hot surfaces before appreciable burn-on can occur.

At temperatures considerably above the point at which coagulation begins, because the stage heating does not entirely protect the surfaces, and because more rapid heating may be desired, it may be preferred to use such a scraper heater or heaters as shown in Fig. 2 at 55. In the high temperature heater or heaters, the liquid is raised to a temperature of about 215 degrees or 220 degrees Fahrenheit for albumen coagulation, and can be raised to temperatures of 265 degrees Fahrenheit or higher for casein coagulation. If the milk is to be processed later at temperatures approaching those attained in the high temperature heater or heaters, it may be desirable to hold the liquid in the holder 56 until the desired coagulation at such temperatures is complete. The degree of coagulation in heater 54 and/or heater 55, and thereafter in the processing, greatly controls the grain, homogeneity, viscosity, and other qualities.

It will be observed that the evaporation of the milk continues at lower temperatures than those achieved in the heater 54 and/or heater 55. This minimizes burn-on in the evaporators.

Fig. 5 shows a typical time-temperature chart of milk treated in accordance with this invention in the apparatus diagrammatically illustrated in Fig. 2. The milk supplied at a temperature which may be assumed to be 50 degrees Fahrenheit is admitted at 86 to the preheater G where its temperature may be raised by means of vapor from the evaporator to approximately 150 degree Fahrenheit at point 87 when it leaves the preheater G. At the point marked 87 on the chart, the milk at a temperature of 150 degrees enters the preheater E where its temperature is raised preferably by means of vapor from the evaporator to approximately 180 degrees as indicated at the point 88 on the chart. It is held at this temperature from the point 88 on the chart to the point 89 on the chart, remaining in the holder 53 during this interval.

At the point 89 on the chart, the milk at a temperature of 180 degrees Fahrenheit enters the tubular heater 54 where its temperature may be raised to any degree, but in this case is raised to approximately 212 degrees at the point marked 90 on the chart. At this point the milk may enter the scraper heater 55 for whatever further increase in temperature may be required. The temperature may be raised to 280 degrees, as indicated by the broken line, or it may be raised to about 220 degrees at the point marked 91 on the chart.

In passing from the scraper heater or other high temperature heater at a temperature of approximately 220 degrees or more, as indicated at 94 on the chart, the milk will drop abruptly to approximately 185 degrees at the point 95 on the chart where the milk enters the first effect A (for the purposes of the chart, the optionally usable holding tank 56 is disregarded). Vapor is evaporated from the milk at a temperature of 185 degrees in the first effect A until the milk is withdrawn from the first effect at the point indicated at 96 on the chart. Thereupon the temperature of the milk is dropped abruptly to approximately 155 degrees as the milk is transferred at the point marked 97 on the chart to the second effect B.

It will be noted that the 185 degree vapor from the first effect A is capable of raising 150 degree milk to 180 degrees between the points marked 87 and 88 on the chart. It will further be noted that the 155 degree vapor from the second effect B is capable of raising the milk from 50 degrees to 150 degrees between the points marked 86 and 87 on the chart.

Instead of the combination of high temperature heaters 54 and 55 and holder 56 as shown in Fig. 2, a modified arrangement may be made as shown in Fig. 9, which could be considered as doing the work of heater 54 and holder 56 of Fig. 2, but arranged for high velocity re-circulation between the heater and holder by means of a pump 101. The numbers 2a, 54a, 56a, 57a, 83a, 85a, and 63a refer to parts similar to those respectively marked, 2, 54, 56, 57, 83, 85 and 63 in Fig. 2.

The device shown in Fig. 9 comprises means for high temperature heating after low temperature heating with vapor. It may, however, be used for the entire heating of the milk if the process requires it, and if the economy and other advantages of the vapor heaters are unnecessary. Burn-on of albumen on the heating surfaces can be almost eliminated by sufficient heating and/or holding before entering the high temperature heater.

Regardless of the specific arrangement, if coagulation is desired, the milk, after being heated to approximately the coagulation point, is preferably heated as nearly instantaneously as possible to temperatures above where coagulation occurs. The resulting coagulation will occur only to a very limited extent on the heat exchange surfaces under these conditions and will occur mostly in situ and in a very fine form. By coagulation in situ, I mean coagulation which occurs in the body of the milk, without precipitation on any heating surface. The coagulation may be conducted without the holders 53, 56 by using temperatures high enough to expedite the coagulation and velocities or scrapers to prevent burn-on. This results in finer precipitated particles and a different product. In the manufacture of evaporated milk, the higher the temperature to which the milk is preheated and the more suddenly it is heated prior to evaporation, the greater can be the range of control of the thickening that occurs in the sterilizers following evaporation.

While the method constituting the invention will be set forth in detail in the appended claims, it may be pointed out that in one aspect, the method includes the heating of milk and the like is successive stages, preferably bringing it close to the point of precipitation in one stage and then adding heat rapidly in successive increments, in each of which precipitation or coagulation on heating surfaces are minimized by the amount of heat previously delivered to the liquid.

The method herein claimed also makes possible the making of a more stable milk product by providing means for the raising of the temperature of the raw milk prior to evaporation to any point between 212 degrees and 265 degrees Fahrenheit or even higher in special cases and maintaining it at this high temperature for a sufficient period to coagulate at least a part of its casein, preferably under conditions such that coagulation occurs in situ as explained above, the milk being moved immediately from the hot surfaces responsible for its abrupt increase in temperature before it can precipitate casein on such surfaces. However, it is seldom necessary to precipitate any large quantity of casein before evaporation.

In another aspect, my invention consists in establishing a pressure gradient in the evaporator and taking vapor at a point in such gradient where its temperature will remain substantially constantly suitable for the heating purpose in mind without thermostatic control.

In a more limited aspect, the method herein disclosed involves the use of heat from the final effect of an evaporator which, enroute to the condenser, would otherwise be wasted, for the heating of milk or like liquids to predetermined temperatures which, in the operation of the evaporator will remain substantially constant and which will raise the heated liquid to a temperature below the point of substantial burn-on.

I do not desire to limit my invention to the foregoing aspects or combinations of such aspects, nor to specific structures except as stated in the appended claims.

This application is a continuation in part of my application Serial No. 591,810, filed May 3, 1945 and entitled Apparatus and Methods for Heating and Evaporating Milk and the like, which has now become abandoned.

I claim:

1. A method of evaporating milk, which is subject to coagulation of some of its components, in a multiple effect evaporator and over a predetermined temperature range in which coagulation of said components occurs, such method consisting in establishing a substantially constant temperature gradient between the effects of the evaporator by fixing the operating conditions thereof, taking vapor from one effect of the evaporator at a predetermined temperature and delivering its heat to a heat transfer surface, contacting the milk enroute to the evaporator with said heat transfer surface, the surface being sufficiently hotter than the milk to abruptly raise the temperature of the milk through said range at a rate such that the temperature rise is completed before substantial coagulation occurs.

2. The method recited in claim 1, in which, following the abrupt raise in temperature of the milk through said range, the milk is withdrawn from and maintained out of contact with surfaces hotter than itself during desired coagulation.

3. The method recited in claim 1, in which, following the abrupt raising of the temperature of the liquid through said range, the liquid is moved rapidly respecting any surfaces in contact therewith pending coagulation.

4. A method of heating milk through at least one coagulation range of temperatures by contact with hot surfaces without material deposit on such surfaces, which method comprises evaporating the milk in a multiple effect evaporator, fixing the conditions of evaporator operation to establish temperature gradient between effects, preheating in one preheating step the milk feeding the evaporator to a temperature adjacent that at which coagulation commences, withdrawing vapor from an evaporator effect at a predetermined temperature determined in the evaporator operation and materially higher than the highest temperature in said range, delivering heat from such vapor in a second preheating step to a heat exchange surface to raise the temperature of such surface to a predetermined value materially higher than the highest temperature in said range, raising the temperature of milk feeding said evaporator abruptly through said range by bringing the milk preheated in the first preheating step into brief contact with said surface, and substantially immediately withdrawing the milk from contact with said surface and holding the milk at temperatures for continued coagulation pending completion of the desired degree of coagulation in situ in the milk.

5. The method of claim 4 in which raw milk is preheated to a temperature of about 155 to 160 degrees Fahrenheit in said one preheating step, and the abrupt increase of the temperature of the preheated milk in the second preheating step raises it to a temperature of at least approximately 180 degrees Fahrenheit at a rate such as to substantially complete the temperature increase before substantial precipitation occurs.

6. A method of reducing burn-on in the evaporation of milk which comprises pre-heating the milk feeding an evaporator in stages including a stage in which the milk is preheated to a point just short of the temperature at which coagulation commences, raising the temperature of the milk in a subsequent stage of preheat abruptly throughout substantially the entire range of desired albumen coagulation at a rate such that the temperature rise is complete before substantial coagulation occurs, substantially immediately discontinuing heat exchange to said milk, and holding the milk at a temperature within the range of coagulation and in contact with no surfaces hotter than itself until coagulation has progressed to the desired degree, evaporating vapor from the milk at a temperature lower than the maximum to which the milk was heated and using this vapor in the preheating of said milk.

7. A milk evaporator comprising a plurality of evaporator effects in series, in combination with a supply line leading to the first effect and comprising a series of heaters with connections in series, said line also comprising a holding tank following one of said heaters, each of said heaters including a passage for milk to be heated and a passage for heating fluid, a connection from a subsequent effect of the evaporator to the heating fluid passage of the first of said heaters for delivering vapor from said subsequent effect to said heating fluid passage for pre-heating raw milk newly arriving in said delivery means in one preheating stage, a connection from another of said effects to the heating fluid passage of another of said heaters for delivering vapor from said other effect to said other heater in a second preheating stage, and a high temperature heating fluid supply means connected to the heating fluid passage of a third heater in a third preheating stage, whereby the third heater is subjected to a sufficient temperature of the heating fluid to raise the milk to a high temperature in said last mentioned heater, said last mentioned heater being at a temperature materially in excess of the temperature of the milk evaporated in said effects.

8. Milk heating apparatus comprising a plurality of heat exchangers each including a heating fluid passage and a milk passage, a holding tank connected in series between the milk passages of the respective heat exchangers, means for pumping milk continuously through the milk passages of the respective heat exchangers and the intervening holding tank, means for supplying heating fluid at differing temperatures to the heating fluid passages of the respective heat exchangers, and means for controlling the temperatures of the heating fluid supplied to the respective heat exchangers, said means being set to maintain a heating fluid temperature in one of said heat exchangers greatly in excess of the temperature to which the milk is heated in traversing the preceding heat exchanger, whereby the heating of the milk in said one heat exchanger is abrupt, the means for pumping the milk through the said one heat exchanger being operable at a rate such that the milk traverses said one heat exchanger and is discharged therefrom following its abrupt change in temperature before substantial coagulation occurs at the temperature to which the milk is raised in said one heat exchanger, the means for supplying heating fluid to a preceding heat exchanger and controlling the temperature thereof comprising an evaporator fed by said milk and including an effect having a vapor connection to the heating fluid passage of said preceding heat exchanger and having a feed connection from the last of said series connected heat exchangers, said evaporator being provided with evaporator controls whereby the operation of said effect is determinative of the temperature of the vapor heating the preceding heat exchanger without separate controls.

9. A method of evaporating milk and regulating the temperature thereof with reference to a predetermined coagulation point of milk ingredients, comprising the steps of heating milk in a first evaporator by transferring heat thereto from a heating fluid at a fixed temperature, discharging partially evaporated milk from the first evaporator to a second evaporator, withdrawing vapor evaporated from the milk in the first evaporator from the first evaporator and passing at least a portion thereof into heat exchange with the milk in the second evaporator, discharging the milk from the second evaporator, withdrawing at least a portion of the vapor from the second evaporator at a fixed temperature below the temperature of the heating fluid in the first evaporator, feeding milk to be heated to the first evaporator, passing said feeding milk en route to the first evaporator in heat exchange with at least a portion of the vapor withdrawn from one of said evaporators whereby to preheat said milk, and establishing a set rate of withdrawal of vapor from said one evaporator for preheating purposes to reduce vapor pressure and the temperature of the vapor and milk in said evaporator below said predetermined coagulation point, and fixing the conditions of evaporator operation to maintain the vapor substantially continuously at said temperature whereby the control of the heating of such milk is automatic.

10. The method of claim 9 in which the predetermined coagulation point is that point at which the albumen in the milk undergoing evaporation will barely begin to coagulate.

11. A method for automatically controlling the temperature of liquid both in an effect of a multiple effect evaporator and in a preheater feeding said effect, comprising the steps of supplying heating fluid to the evaporator at a fixed temperature and withdrawing vapor from the evaporator at a lower fixed temperature to establish predetermined temperature differences across each effect, withdrawing vapor from the liquid in said effect and delivering heat from said vapor at a set rate to the liquid in the preheater feeding said effect whereby vapor pressure and temperature in said effect is lowered below that otherwise obtaining in said effect and to a degree determined by said rate of heat delivery whereby the temperature of the liquid in the said effect and in the preheater is automatically fixed by said lower temperature.

12. The method of claim 11 in which all the vapor generated in said effect is withdrawn for delivery to said preheater, plus the step of discharging at least part of said vapor from said preheater to a subsequent effect for evaporating purposes.

13. The method of claim 11 in which a part only of the vapor generated in said effect is withdrawn for delivery to said preheater, the remainder of the vapor being delivered to a subsequent effect for evaporating purposes.

ROY O. HENSZEY.

REFERENCES CITED

The following references are of record in the file of this patent:

UNITED STATES PATENTS

| Number | Name | Date |
|---|---|---|
| 780,612 | Meyer | Jan. 24, 1905 |
| 1,067,336 | Hay | July 15, 1913 |
| 1,302,786 | Glidie | May 6, 1919 |
| 2,010,902 | Stephansan | Aug. 13, 1935 |
| 2,090,984 | Peebles | Aug. 24, 1937 |
| 2,233,855 | Suss | Mar. 4, 1941 |
| 2,236,087 | Detwiler | Mar. 25, 1941 |
| 2,258,445 | Coopey | Oct. 7, 1941 |

FOREIGN PATENTS

| Number | Country | Date |
|---|---|---|
| 334,623 | Great Britain | June 11, 1929 |

OTHER REFERENCES

"Condensed Milk and Milk Powder," by G. F. Hunziker, 4th edition, published by the author, La Grange, Illinois, 1926, pages 50, 51, 53, 56, 123, 124, 156 to 164, 238, 239, 441.